Feb. 14, 1933. K. C. BRIGHT ET AL 1,897,888
TIRE TRUNK
Filed May 31, 1930 2 Sheets-Sheet 1
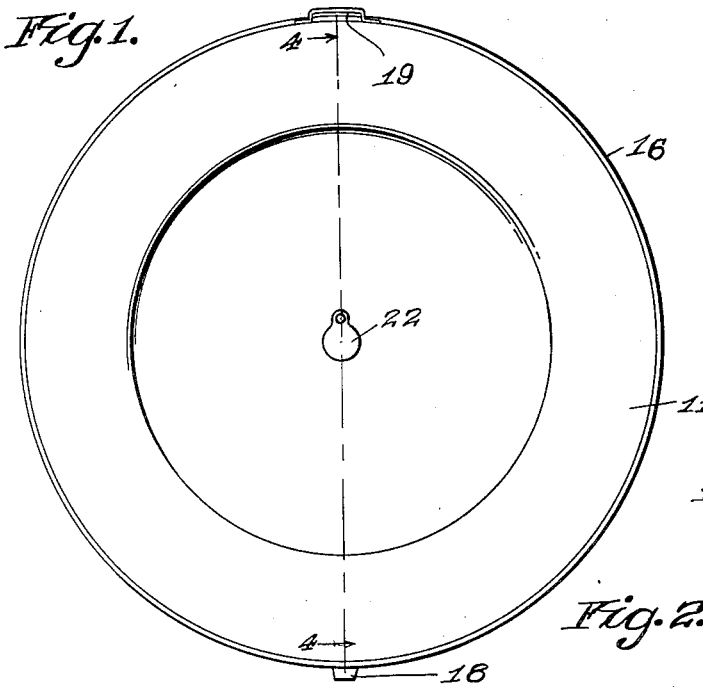
Fig.1.
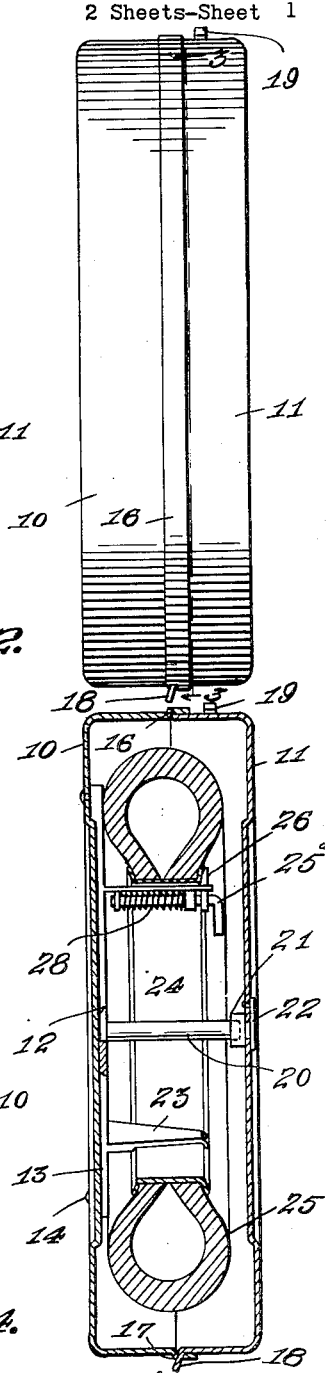
Fig.2.
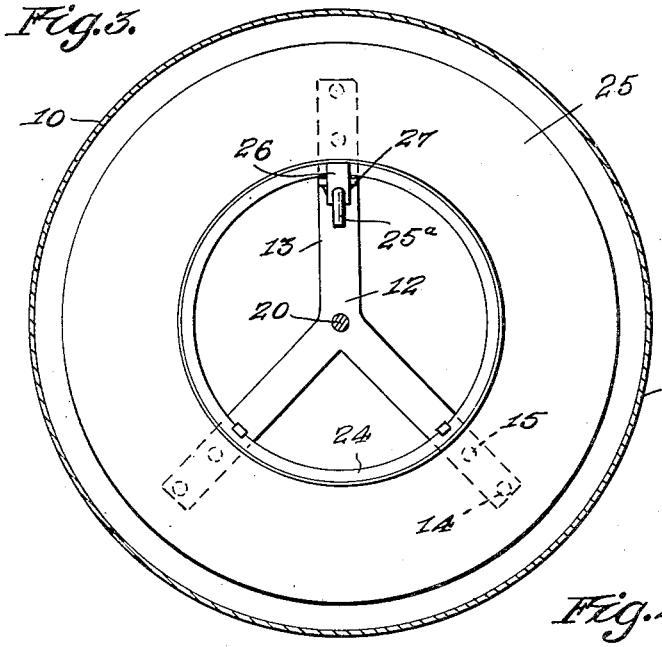
Fig.3.
Fig.4.
K. C. Bright,
J. N. Sweeney, INVENTOR
BY Victor J. Evans
ATTORNEY Feb. 14, 1933.  K. C. BRIGHT ET AL  1,897,888
TIRE TRUNK
Filed May 31, 1930  2 Sheets-Sheet 2
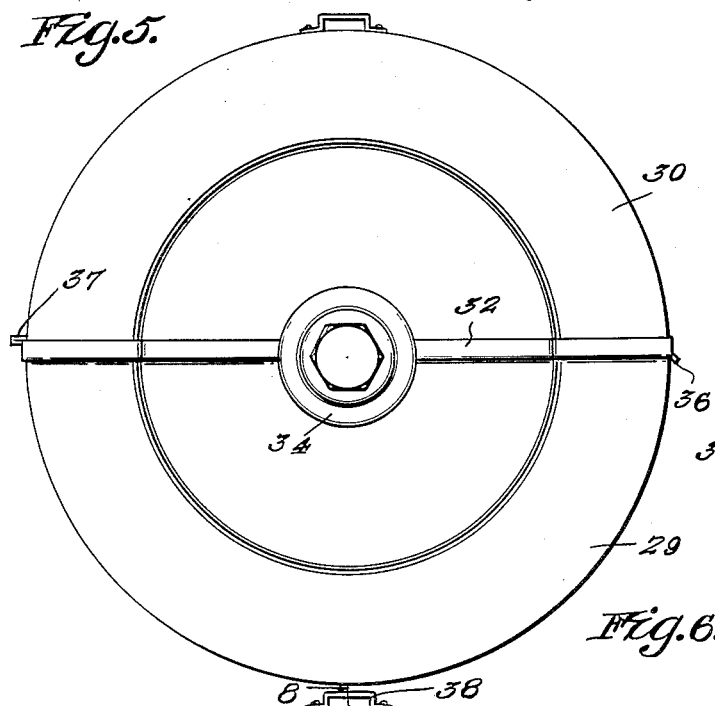
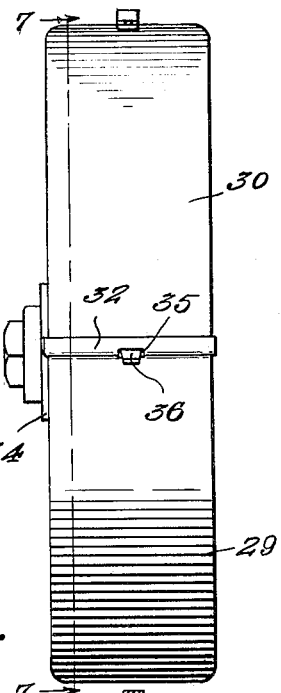
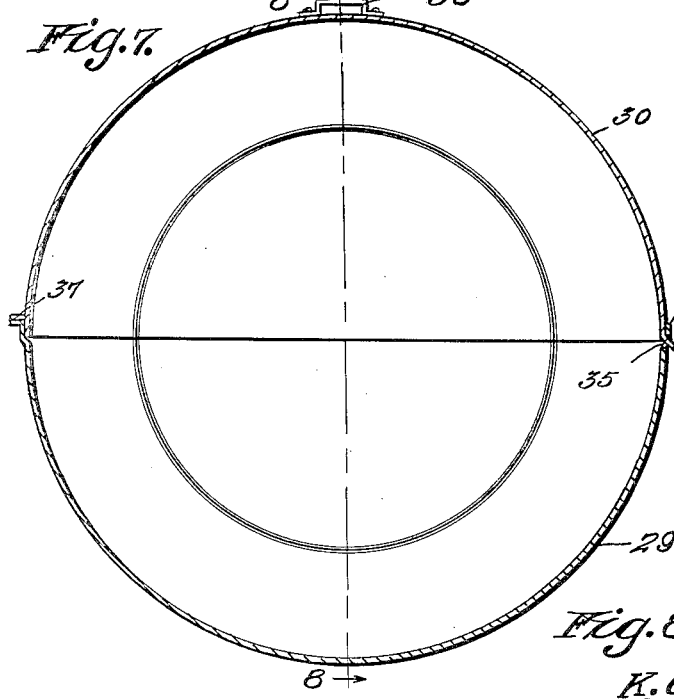
K. C. Bright,
J. N. Sweeney, INVENTOR
BY Victor J. Evans
ATTORNEY Patented Feb. 14, 1933

1,897,888

UNITED STATES PATENT OFFICE

KEITH C. BRIGHT AND JOHN NELSON SWEENEY, OF CHAMPION, NEBRASKA

TIRE TRUNK

Application filed May 31, 1930. Serial No. 458,408.

This invention relates to spare tire carriers for automobiles, an object of the invention being to provide a trunk or container which may be mounted upon an automobile to receive and enclose a spare rim and tire so as to protect the same from the action of the sun, dirt, etc., and at the same time to provide a neat and attractive automobile accessory.

Another object of the invention is the provision of a tire trunk or container which is formed of separate sections having novel inter-engaging means for connecting the sections, together with a locking means housed within the trunk so that danger of injury thereto by collision, will be materially reduced.

Another object of the invention is the provision of a tire trunk which may be mounted at the rear or upon the running board or fender of an automobile.

With the above and other objects in view, the invention further includes the following novel features and details of construction, to be hereinafter more fully described, illustrated in the accompanying drawings and pointed out in the appended claim.

In the drawings:—

Figure 1 is an elevation of the invention.
Figure 2 is an edge view.
Figure 3 is a section on the line 3—3 of Figure 2.
Figure 4 is a section on the line 4—4 of Figure 1.
Figure 5 is an elevation of a slightly different form of the invention.
Figure 6 is an edge view of the same.
Figure 7 is a section on the line 7—7 of Figure 6.
Figure 8 is a section on the line 8—8 of Figure 7.

Referring to the drawings in detail wherein like characters of reference denote corresponding parts, the trunk or container as shown is of sectional formation and includes a stationary section 10 and a removable section 11. The form of the invention shown in Figures 1 to 4 of the drawings is especially designed for attachment to the rear of an automobile in substitution of the ordinary tire carrier.

For this purpose, a stationary section 10 has secured therein a spider 12. This spider includes radially extending arms 13 which are attached to the section 10 as shown at 14, and which are provided with openings 15 for the passage of bolts or other attaching devices, whereby the spider may be secured to an automobile. The section 10 is provided with an offset circumferential flange 16 which is designed to receive the edge of the section 11, and this flange is provided with an opening 17 for the reception of a tongue 18 carried by the section 11. The sections are thus hingedly and detachably connected. The section 11 is provided with a handle or grip 19 for convenience in removing and replacing the section.

Rigidly secured to and extending from the spider 12 is an arm or post 20. The extended end of this arm or post 20 passes through an opening provided in the casing 21 of a lock which is carried by the section 11. A pivoted closure plate 22 is attached to the outer face of the section 11 for closing the keyhole of the lock so as to prevent the passage of rain and dirt. The sections 10 and 11 may thus be securely locked together with the locking means housed within the sections and protected from injury due to collision.

Extending from the arms 13 of the spider are arms 23, and these arms are adapted to be engaged by and support a spare rim 24 of a spare tire 25. One of these arms 23 slidingly supports a rod 25a, and this rod has rigidly secured thereto a lug 26 which is designed to be received within a notch 27 provided in the outer end of the arm 23. The rod 25a carries a spring 28 which yieldingly holds the lug 26 seated within the notch 27 and bearing against the rim 24. By drawing the rod outward and partially rotating the same, the spare tire may be easily removed and replaced.

In Figures 5 to 8 of the drawings, the trunk or container is diametrically divided so as to provide a stationary section 29 and a removable section 30. This form of the invention is designed to be attached to the fender or running board of an automobile for carrying a spare tire 31. The section 29 is provided with an offset flange 32 around its edge, so as to receive the edge of the section 30. Each of said sections have semi-circular openings 33 for the reception of the hub 34 of a spare wheel.

In this form of the invention, the flange 32 is provided with an opening 35 to receive a tongue 36 extending from the section 30, so that the sections are hingedly connected after the manner of the sections 10 and 11. The sections 29 and 30 have extending therefrom apertured lugs 37 which receive a suitable lock (not shown). The section 30 is likewise provided with a handle or grip 38.

The invention is susceptible of various changes in its form, proportions and minor details of construction and the right is herein reserved to make such changes as properly fall within the scope of the appended claim.

Having described the invention what is claimed is:—

In a tire trunk, a two-part circular casing having the adjacent edges of the parts arranged in overlapped relation for interfitting engagement with each other, one of the parts having an opening, a tongue on the other part and extending through the opening and offset relative to the last named part, a tire rack secured within one of the parts, and a fastening medium carried by the other part of the casing and adapted to engage a portion of the rack interiorly of said casing to lock the casing parts together.

In testimony whereof we affix our signatures.

KEITH C. BRIGHT.
JOHN NELSON SWEENEY.